US008423771B2

(12) United States Patent
Sueyoshi et al.

(10) Patent No.: US 8,423,771 B2
(45) Date of Patent: Apr. 16, 2013

(54) INFORMATION PROCESSING APPARATUS AND METHOD, SETTING APPARATUS AND METHOD, AND PROGRAM

(75) Inventors: Masahiro Sueyoshi, Kanagawa (JP); Yuji Hiura, Kanagawa (JP); Yoshiaki Hirano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1156 days.

(21) Appl. No.: 11/583,891

(22) Filed: Oct. 20, 2006

(65) Prior Publication Data

US 2007/0110246 A1    May 17, 2007

(30) Foreign Application Priority Data

Oct. 26, 2005   (JP) ............................... P2005-310675

(51) Int. Cl.
    *G06F 21/00*    (2006.01)
(52) U.S. Cl.
    USPC ........................................................ 713/171
(58) Field of Classification Search .......... 380/277–279; 713/171
    See application file for complete search history.

(56) References Cited

U.S. PATENT DOCUMENTS

| 5,623,637 | A | 4/1997 | Jones et al. |
| 5,745,571 | A | 4/1998 | Zuk |
| 5,790,667 | A | 8/1998 | Omori et al. |
| 6,415,142 | B1 * | 7/2002 | Martineau ..................... 455/411 |
| 7,350,086 | B2 * | 3/2008 | Nakajima ..................... 713/193 |
| 2002/0111918 | A1 * | 8/2002 | Hoshino et al. ................ 705/65 |
| 2003/0142669 | A1 * | 7/2003 | Kubota et al. ................ 370/389 |
| 2004/0125402 | A1 * | 7/2004 | Kanai et al. .................. 358/1.15 |
| 2004/0247118 | A1 | 12/2004 | Tateno et al. |
| 2005/0066199 | A1 | 3/2005 | Lin |
| 2006/0039557 | A1 | 2/2006 | Omori et al. |
| 2006/0053302 | A1 * | 3/2006 | Yasaki et al. .................. 713/183 |
| 2006/0144928 | A1 | 7/2006 | Takada et al. |
| 2007/0226513 | A1 * | 9/2007 | Handa et al. .................. 713/186 |

FOREIGN PATENT DOCUMENTS

| DK | 199 25 389 | 12/2000 |
| EP | 0 893 751 A1 | 1/1999 |
| EP | 1 117 077 | 1/2001 |
| EP | 1 235 380 A1 | 8/2002 |
| EP | 1 524 581 A1 | 4/2005 |
| EP | 1 533 706 A1 | 5/2005 |
| GB | 2 329 499 | 3/1999 |

(Continued)

OTHER PUBLICATIONS

European Search Report; Application No. 06122818.5-1238; Dated: Feb. 22, 2007.

(Continued)

*Primary Examiner* — Brandon Hoffman
*Assistant Examiner* — Anthony Brown
(74) *Attorney, Agent, or Firm* — Rader, Fishman & Grauer PLLC

(57) ABSTRACT

An information processing apparatus for using key information calculated on the basis of predetermined information including information obtained from an IC chip as a communication party on the other end in order to perform encryption processing with the IC chip. The information processing apparatus includes: among a plurality of calculation modules for calculating the key information being individually different in accordance with predetermined algorithms, control means for causing the calculation module identified by identification information input from the outside to calculate the key information; and encryption means for encrypting data by the key information calculated.

11 Claims, 19 Drawing Sheets

FOREIGN PATENT DOCUMENTS

| | | |
|---|---|---|
| JP | 2000-036014 A | 2/2000 |
| JP | 2000-036021 A | 2/2000 |
| JP | 2002-135243 A | 5/2002 |
| JP | 2003-141460 A | 5/2003 |
| JP | 2004-112476 A | 4/2004 |
| JP | 2004-112510 A | 4/2004 |
| JP | 2004-253875 | 9/2004 |
| JP | 2004-274211 | 9/2004 |
| JP | 2004-282361 A | 10/2004 |
| JP | 2004-295228 A | 10/2004 |
| JP | 2005-038222 | 2/2005 |
| JP | 2005-055958 | 3/2005 |
| JP | 2005-064683 A | 3/2005 |
| WO | WO-97/16904 | 5/1997 |
| WO | WO-01/77920 A1 | 10/2001 |
| WO | WO-02/33883 | 4/2002 |
| WO | WO-03/038769 | 5/2003 |

OTHER PUBLICATIONS

Singapore Search Report dated Feb. 1, 2008 for corresponding Singapore Application No. 200607331-6 completed by the Austrian Patent Office.

English translation of a Japanese Office issued Apr. 27, 2010 for corresponding Japanese Application No. 2005-310675.

Tatsuaki Okamoto et al., "Series/Mathematics of the Information Science Modern Encryption", Sangyotosho Publication Co. Ltd., Jun. 30, 1997, first edition pp. 153-155.

Japanese Office Action issued Nov. 4, 2010 for corresponding Japanese Application No. 2005-310675.

* cited by examiner

FIG. 7

| LOGIC CATEGORY | LOGIC PATTERN | LOGIC-IDENTIFICATION INFORMATION | SERVICE PROVIDER |
|---|---|---|---|
| 1 | 1 | 00010001 | A |
| 1 | 2 | 00010002 | B |
| 2 | 1 | 00020001 | C |
| ... | ... | ... | ... |

FIG. 10

| AREA | KEY |
|---|---|
| DATA I IN IC CARD A | 12345678h (KEY A) |
| DATA I IN IC CARD B | 81234567h (KEY B) |
| DATA I IN IC CARD C | 78123456h (KEY C) |

FIG. 11

| CARD | SPECIFIC INFORMATION |
|---|---|
| SPECIFIC INFORMATION a IN IC CARD A | 1h (VALUE a) |
| SPECIFIC INFORMATION b IN IC CARD B | 2h (VALUE b) |
| SPECIFIC INFORMATION c IN IC CARD C | 3h (VALUE c) |

FIG. 12

| AREA | ADDITIONAL INFORMATION 1 |
|---|---|
| DATA I IN IC CARD A | 1h (VALUE I1) |
| DATA I IN IC CARD B | 1h (VALUE I1) |
| DATA I IN IC CARD C | 1h (VALUE I1) |

FIG. 13

| STORED IN SAM | SPECIFIC INFORMATION (KEY D) |
|---|---|
| LOGIC-PROCESSING SECTION SPECIFIC INFORMATION | 34567812h (KEY D) |

INFORMATION PROCESSING APPARATUS AND METHOD, SETTING APPARATUS AND METHOD, AND PROGRAM

CROSS REFERENCES TO RELATED APPLICATIONS

The present invention contains subject matter related to Japanese Patent Application JP 2005-310675 filed in the Japanese Patent Office on Oct. 26, 2005, the entire contents of which are incorporated herein by reference.

BACKGROUND OF THE INVENTION

1. Field of the Invention

The present invention relates to an information processing apparatus and method, a setting apparatus and method, and a program. More particularly, the present invention relates to an information processing apparatus and method, a setting apparatus and method, and a program capable of specifying a module for calculating key information corresponding to a service from the outside.

2. Description of the Related Art

In recent years, various services using an IC card, in which an IC chip is embedded, such as FeliCa (registered trademark), etc., have become widespread. Such services include, for example an electronic money service which enables a user to pay for goods at purchase time using an IC card, a service which enables a user to use an IC card as a ticket for transportation facilities, such as a train, etc., a service which enables a user to take care of reward points issued by stores, and the like.

These services are implemented, for example by the configuration as shown in FIG. 1.

In the example shown in FIG. 1, an application server 2 and a client terminal 4 are connected through the Internet 3. A SAM (Secure Application Module) 1 is connected to the application server 2, and a reader/writer 5 is connected to the client terminal 4. The reader/writer 5 may be provided as being contained in the client terminal 4. The SAM 1, the application server 2, the client terminal 4, and the reader/writer 5 are provided by a service provider, for example.

Also, in the example in FIG. 1, an IC card 6, in which a contactless IC chip 7 is embedded, is in close vicinity of the reader/writer 5, and thus the IC card 6 can perform short-distance communication with the reader/writer 5 using electromagnetic induction. The IC card 6 is carried around by a user of the services.

The SAM 1 is a tamper-resistant apparatus, and performs encryption processing and management of a key used in the encryption processing. The SAM 1 encrypts a command supplied from the application server 2, and outputs the encrypted command to the application server 2. The SAM 1 and the IC chip 7 individually have a common key, and encryption communication is performed between the SAM 1 and the IC chip 7 by the transmission and receiving of the information encrypted by that key through each of the apparatuses.

The application server 2 outputs the command (command to be executed by the IC chip 7) created in response to a request from the client terminal 4 to the SAM 1. Also, when the encrypted command is supplied from the SAM 1, the application server 2 transmits it to the client terminal 4. An HTTP (Hyper Text Transfer Protocol) server and an HTTP client are implemented in the application server 2 and the client terminal 4, respectively. Such data transmission and receiving are performed by the HTTP communication.

Also, the application server 2 transmits screen information to the client terminal 4, and displays it on the display of the client terminal 4.

The client terminal 4 transmits a predetermined request to the application server 2. At the same time, when a command is transmitted from the application server 2, the client terminal 4 supplies the command to the IC chip 7 through the reader/writer 5 to execute it.

The IC chip 7 decrypts the encrypted command that has been transmitted from the SAM 1 through the reader/writer 5, etc., and executes the command. When the content of the command is, for example to instruct to rewrite electronic money, the command also includes amount-of-money information to rewrite, etc.

In a system having such a configuration, for example when a user of the IC card 6, who is a user of an electronic money service, pays for goods using electronic money stored in the IC chip 7, a payment request of the goods is transmitted from the client terminal 4 to the application server 2 in response to the user holding the IC card 6 above the reader/writer 5. The application server 2, which has received the request, creates the command (Read command) for requesting the IC chip 7 to read the balance of the electronic money.

The Read command created by the application server 2 is encrypted by the SAM 1, and then is transmitted to the IC chip 7 through the application server 2, the Internet 3, the client terminal 4, and the reader/writer 5. After the Read command is decrypted in the IC chip 7, the Read command is executed.

The balance which has been read by the execution of the Read command is encrypted by the IC chip 7, and then is transmitted to the SAM 1 through the reader/writer 5, the client terminal 4, the Internet 3, and the application server 2 as a response to the application server 2. The SAM 1 decrypts the encrypted balance transmitted from the IC chip 7, and the decrypted balance is transmitted to the application server 2.

Thus, it is possible for the application server 2 to check the current balance of the electronic money stored in the IC chip 7.

When the application server 2 checked the balance, the application server 2 creates the command (Write command) for requesting the IC chip 7 to rewrite the balance (replace the previous balance with the difference when the price of the goods is subtracted from the previous balance) of the electronic money.

In the same manner as the Read command transmitted before, the Write command created by the application server 2 is encrypted by the SAM 1, and then is transmitted to the IC chip 7 through the application server 2, the Internet 3, the client terminal 4, and the reader/writer 5. After the Write command is decrypted in the IC chip 7, the Write command is executed. The Write command also includes information indicating the new balance. Thus, the balance of the electronic money stored in the IC chip 7 becomes the difference when the price of the goods is subtracted from the previous balance.

For example, after the processing is performed, such as a message notifying the completion of the subtraction from the previous balance is transmitted from the IC chip 7 to the application server 2, a series of processing is terminated. The payment of the price of the goods is carried out by such processing.

In this regard, at the time of starting a series of processing, the identification information of the IC chip 7, the information stored in the area allocated to an electronic money service out of the memory disposed in the IC chip 7, etc., are transmitted from the IC chip 7 to the SAM 1. Mutual authentication using the key calculated by the SAM 1 is performed between the SAM 1 and the IC chip 7 on the basis of the transmitted information, etc. When the mutual authentication has been successful, the encryption of the above-described data (command), the decryption of the encrypted data, etc., are performed using the key information calculated at the time of the mutual authentication. Japanese Unexamined Patent Application Publication No. 2004-274211 has disclosed a system in which mutual authentication is performed, and the processing is performed between the SAM and IC chip that have succeeded in the mutual authentication.

FIG. 2 is a diagram illustrating an example of the software configuration of the SAM 1.

As shown in FIG. 2, the SAM 1 is provided with software including a common portion 11 and logic 12.

The common portion 11 is a software module provided in common for SAMs achieving any services. The common portion 11 includes the descriptions of the algorithms for performing, for example the mutual authentication with the IC chip, which is performed using the key information calculated by the logic 12, the encryption of the command created by the application server 2, the decryption of the encrypted data by the IC chip, etc.

The logic 12 is a software module provided differently for each service (for each memory area (area for reading and writing data) of the IC chip to be an access destination). The logic 12 includes, for example the description of the algorithm for calculating the key information used for the mutual authentication, the data encryption, the decryption of the encrypted data on the basis of the information obtained from the IC chip to be the communication party on the other end at the start time of the communication.

The common portion 11 performs the encryption processing (the mutual authentication, the data encryption, the decryption of the encrypted data) using the key information calculated by the logic 12 appropriately.

In this regard, the software configuration shown in FIG. 2 may be not included in the SAM 1, and may be included in the application server 2. In this case, the encryption processing is performed by the application server 2 itself.

SUMMARY OF THE INVENTION

Now, a different area is allocated to each service in the memory of an IC chip, and different key information is necessary for reading and writing data stored in each area. That is to say, it is necessary that logic for calculating different key information is provided for an SAM or an application server (application server having a configuration of performing encryption processing by itself). When a new service different from the services provided previously is provided, it is necessary for a service provider to newly provide logic for calculating the key information used for the new service to the SAM or the application server.

Accordingly, in this case, it is necessary for the service provider to request a manufacturer, who is a supplier of the SAM or the application server, to prepare for the logic for calculating the key information corresponding to the new service, and thus it takes time and effort.

Also, in particular, when a logic included in an application server is renewed, it is difficult to keep a logic (algorithm) for calculating the key information corresponding to a new service secret and to provide that logic, because an application server is not a tamper-resistant apparatus, and it is easier to know the content of the software provided for the apparatus compared with a tamper-resistant apparatus.

As shown in FIG. 2, these things are caused by the fact that only one piece of logic is provided for one SAM or application server, and the fact that the type of the algorithm (key-information calculation algorithm) used in one SAM or application server is limited, and the like.

Furthermore, some service providers desire to determine the parameters necessary for the calculation of key information, and desire a programmer of a manufacturer to set them in the SAM, etc. That is to say, they desire to separate a person who determines the parameters from a person who sets the parameters. However, as described above, it has been difficult, because a manufacturer prepares the logic.

The present invention has been made in view of these situations. It is desirable, for example to make it possible to specify a module for calculating the key information corresponding to a service from the outside.

According to an embodiment of the present invention, there is provided an information processing apparatus for using key information calculated on the basis of predetermined information including information obtained from an IC chip as a communication party on the other end in order to perform encryption processing with the IC chip, the information processing apparatus including: among a plurality of calculation modules for calculating the key information being individually different in accordance with predetermined algorithms, control means for causing the calculation module identified by identification information input from the outside to calculate the key information; and encryption means for encrypting data by the key information calculated.

The control means may cause the calculation module to calculate the key information on the basis of a parameter input by an administration unit in addition to the information obtained from the IC chip as a communication party on the other end.

According to another embodiment of the present invention, there is provided a method of information processing of an information processing apparatus for using key information calculated on the basis of predetermined information including information obtained from an IC chip as a communication party on the other end in order to perform encryption processing with the IC chip, the method including the steps of: among a plurality of calculation modules for calculating the key information being individually different in accordance with predetermined algorithms, controlling for causing the calculation module identified by identification information input from the outside to calculate the key information; and encrypting for encrypting data by the key information calculated.

According to another embodiment of the present invention, there is provided a program for causing a computer to perform information processing in an information processing apparatus for using key information calculated on the basis of predetermined information including information obtained from an IC chip as a communication party on the other end in order to perform encryption processing with the IC chip, the program including the steps of: among a plurality of calculation modules for calculating the key information being individually different in accordance with predetermined algorithms, controlling for causing the calculation module identified by identification information input from the outside to calculate the key information; and encrypting for encrypting data by the key information calculated.

According to another embodiment of the present invention, there is provided, for an information processing apparatus for using key information calculated on the basis of predetermined information including information obtained from an IC chip as a communication party on the other end in order to perform encryption processing with the IC chip, a setting apparatus for setting part of information among the predetermined information, the setting apparatus including: first encryption means for encrypting part of information input by an administration unit among the predetermined information; second encryption means for encrypting an entire file describing information encrypted by the first encryption means; generation means for generating a predetermined format file enabling the information processing apparatus to capture information on the basis of a file obtained by being subjected to encryption by the second encryption means; and setting means for outputting the predetermined format file generated by the generation means to the information processing apparatus and setting part of information among the predetermined information.

According to another embodiment of the present invention, there is provided, for an information processing apparatus for using key information calculated on the basis of predetermined information including information obtained from an IC chip as a communication party on the other end in order to perform encryption processing with the IC chip, a method of setting part of information among the predetermined information, the method including the steps of: encrypting part of information input by an administration unit among the predetermined information; encrypting an entire file describing the encrypted information; generating a predetermined format file enabling the information processing apparatus to capture information on the basis of a file obtained by being subjected to the encryption; and outputting the generated predetermined format file to the information processing apparatus and setting part of information among the predetermined information.

According to another embodiment of the present invention, there is provided, for an information processing apparatus for using key information calculated on the basis of predetermined information including information obtained from an IC chip as a communication party on the other end in order to perform encryption processing with the IC chip, a program for causing a computer to perform setting part of information among the predetermined information, the method including the steps of: encrypting part of information input by an administration unit among the predetermined information; encrypting an entire file describing the encrypted information; generating a predetermined format file enabling the information processing apparatus to capture information on the basis of a file obtained by being subjected to the encryption; and outputting the generated predetermined format file to the information processing apparatus and setting part of information among the predetermined information.

In an embodiment of the present invention, control is performed such that the key information is calculated by the calculation module identified by identification information input from the outside among a plurality of calculation modules for calculating the key information being individually different in accordance with predetermined algorithms.

In another embodiment of the present invention, encryption processing is performed on part of information input by an administration unit among the predetermined information, and then encryption processing is performed on the entire file describing the encrypted information. On the basis of the file obtained by being subjected to the encryption, a predetermined format file enabling the information processing apparatus to capture information is generated. Also, the generated predetermined-format file is output to the information processing apparatus, and part of information among the predetermined information is set in the information processing apparatus.

According to an embodiment of the present invention, it is possible to specify the module for calculating the key information corresponding to a service from the outside.

According to another embodiment of the present invention, it is possible to set information necessary for calculating key information while keeping the information secret.

BRIEF DESCRIPTION OF THE DRAWINGS

FIG. 7 is a diagram illustrating an example of logic-identification information;

FIG. 10 is a diagram illustrating an example of key information;

FIG. 11 is a diagram illustrating an example of specific information;

FIG. 12 is a diagram illustrating an example of additional information;

FIG. 13 is a diagram illustrating an example of logic-processing section specific information;

DESCRIPTION OF THE PREFERRED EMBODIMENTS

Figure 1:
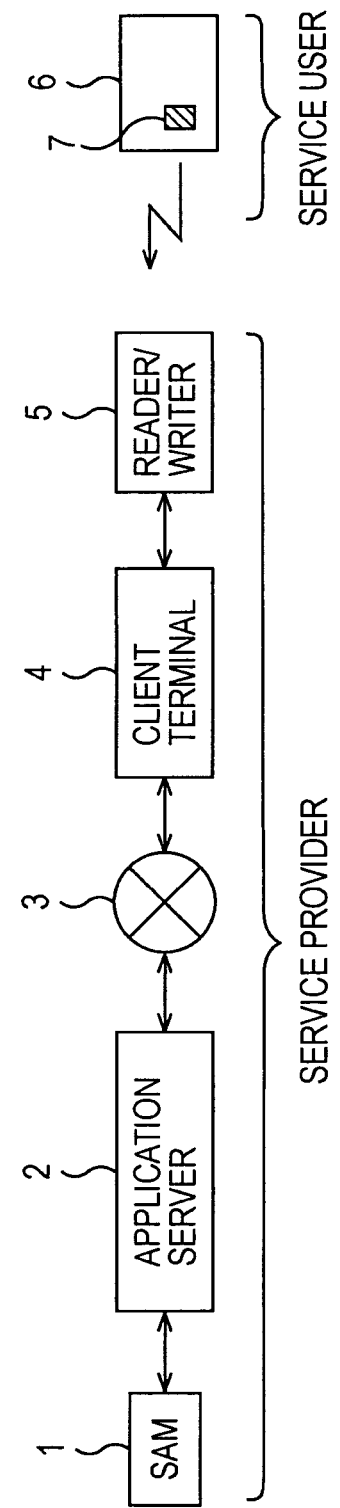
FIG. 1 is a block diagram of illustrating an example of the configuration for achieving a service using an IC card.
Figure 2:
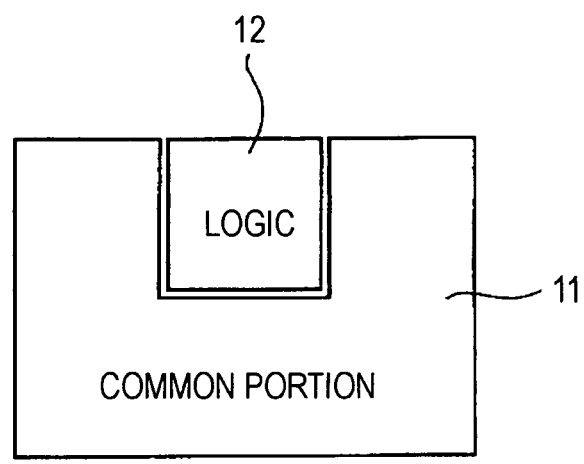
FIG. 2 is a diagram illustrating an example of the software configuration of an SAM.

In the following, a description will be given of an embodiment of the present invention. The relationship between the constituent features of the present invention and the embodiment described in the specification or the drawings is exemplified as follows. This description is for confirming that an embodiment supporting the present invention is included in the specification or the drawings. Accordingly, if there is an embodiment included in the specification or the drawings, but not included here as an embodiment corresponding to the constituent features, the fact does not mean that the embodiment does not corresponds to the constituent features. On the contrary, if an embodiment is included here as constituent features corresponding to the present invention, the fact does not mean the embodiment does not correspond to the features other than the constituent features.

According to an embodiment of the present invention, there is provided an information processing apparatus (for example the SAM 1 in FIG. 3) for using key information calculated on the basis of predetermined information including information obtained from an IC chip as a communication party on the other end in order to perform encryption processing with the IC chip, the information processing apparatus including: among a plurality of calculation modules (for example, logic 12-1 to 12-n) for calculating the key information being individually different in accordance with predetermined algorithms, control means (for example, a control section 41 in FIG. 9) for causing the calculation module identified by identification information (for example, logic-identification information) input from the outside to calculate the key information; and encryption means for encrypting data by the key information calculated.

The control means may cause the calculation module to calculate the key information on the basis of a parameter (for example, logic-processing section specific information) input by an administration unit in addition to the information obtained from the IC chip as a communication party on the other end.

According to another embodiment of the present invention, there is provided, for an information processing apparatus (for example the SAM 1 in FIG. 3) for using key information calculated on the basis of predetermined information including information obtained from an IC chip as a communication party on the other end in order to perform encryption processing with the IC chip, a setting apparatus (for example, the setting apparatus in FIG. 19) for setting part of information (for example, logic-processing section specific information) among the predetermined information, the setting apparatus including: first encryption means (for example, an encryption tool 51 in FIG. 19) for encrypting part of information input by an administration unit among the predetermined information; second encryption means (for example, an encryption tool 53 in FIG. 19) for encrypting an entire file (for example, the setting input file in FIG. 19) describing information encrypted by the first encryption means; generation means (for example, a setting support tool 54 in FIG. 19) for generating a predetermined format file (for example, the setting package file in FIG. 19) enabling the information processing apparatus to capture information on the basis of a file obtained by being subjected to encryption by the second encryption means; and setting means (for example, a management tool 56 in FIG. 19) for outputting the predetermined format file generated by the generation means to the information processing apparatus and setting part of information among the predetermined information.

In the following, a description will be given of an embodiment of the present invention with reference to the drawings.

Figure 3:
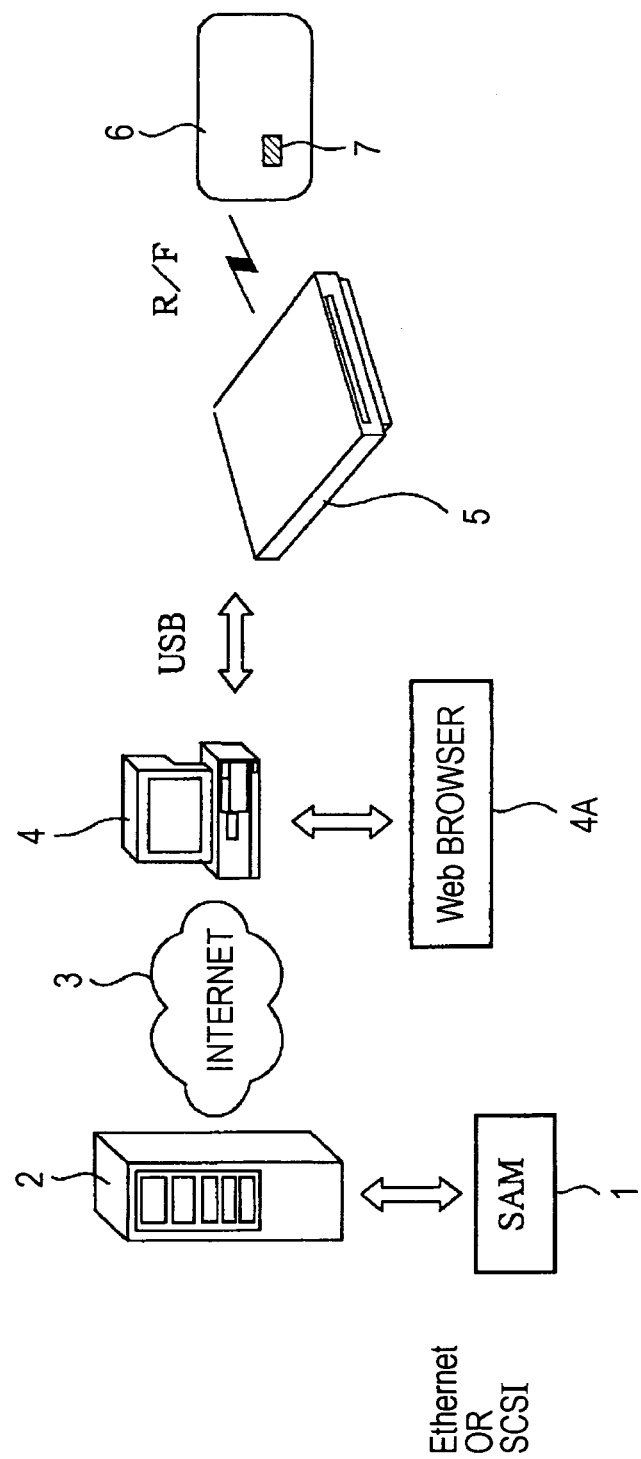
FIG. 3 is a diagram illustrating an example of the configuration of an information processing system according to an embodiment of the present invention.

FIG. 3 is a diagram illustrating the configuration of an information processing system according to an embodiment of the present invention. The components corresponding to the components in FIG. 1 are marked with the same numerals and symbols.

In the example in FIG. 3, an application server 2 and a client terminal 4 are connected through the Internet 3. A SAM 1 is connected to the application server 2 through a SCSI (Small Computer System Interface) interface or Ethernet (registered trademark). A reader/writer 5 (dumb type) is connected to the client terminal 4 through USB (Universal Serial Bus), etc. Radio communication, corresponding to a physical level, with an IC chip (a chip contained in an IC card) in close vicinity is achieved by the reader/writer 5. The SAM 1, the application server 2, the client terminal 4, and the reader/writer 5 are provided by a service provider, for example.

In this regard, only one client terminal 4 is shown in FIG. 3. However, a plurality of client terminals are connected to the application server 2 through the Internet 3. Also, the function of the reader/writer 5 may be contained in the client terminal 4. The function of the SAM 1 may be contained in the application server 2.

Also, in the example of FIG. 3, an IC card 6 including an IC chip 7 is in close vicinity to the reader/writer 5 so that it is possible to perform short-distance communication with the reader/writer 5 using electromagnetic induction. The IC card 6 is carried around by a user of the service.

As described above, the SAM 1 is a tamper-resistant apparatus, and performs encryption processing and management of a key to be used in the encryption processing. The SAM 1 encrypts a command supplied from the application server 2, and outputs the encrypted command to the application server 2. The SAM 1 and the IC chip 7 individually have a common key, and encryption communication is performed between the SAM 1 and the IC chip 7 by the information encrypted by the key being transmitted and received through each apparatus.

The application server 2 outputs the command created in response to a request from the client terminal 4 to the SAM 1. Also, when the encrypted command is supplied from the SAM 1, the application server 2 transmits it to the client terminal 4. An HTTP (Hyper Text Transfer Protocol) server and an HTTP client are implemented in the application server 2 and the client terminal 4, respectively. Such data transmission and receiving are performed by the HTTP communication.

Also, the application server 2 transmits screen information to the client terminal 4, and displays it on the display of the client terminal 4.

The client terminal 4 transmits a predetermined request to the application server 2. At the same time, when a command is transmitted from the application server 2, the client terminal 4 supplies the command to the IC chip 7 through the reader/writer 5 to execute it. The client terminal 4 is provided with a Web browser 4A. Operations using the client terminal 4 are appropriately performed on the screen displayed by the Web browser 4A on the display of the client terminal 4 when accessing to the application server 2.

The IC chip 7 decrypts the encrypted command that has been transmitted from the SAM 1 through the reader/writer 5, etc., and executes the command. When the content of the command is to rewrite electronic money, the command also includes amount-of-money information to rewrite, etc.

In this manner, the application server 2, the client terminal 4, and the reader/writer 5 that lie between the SAM 1 and the IC chip 7 play only a role of storing a command and a response content in a data payload portion and relaying them, and are not involved with data encryption and decryption, mutual authentication, etc. Accordingly, in the following, a description will be appropriately given on the assumption that information transmitted from the apparatuses of the service provider side, that is to say, the application server 2, the client terminal 4, and the reader/writer 5 to the IC chip 7 is information transmitted from the SAM 1. Also, a description will be given on the assumption that information transmitted from the IC chip 7 to the apparatuses of the service provider side is information transmitted to the SAM 1.

Figure 4:
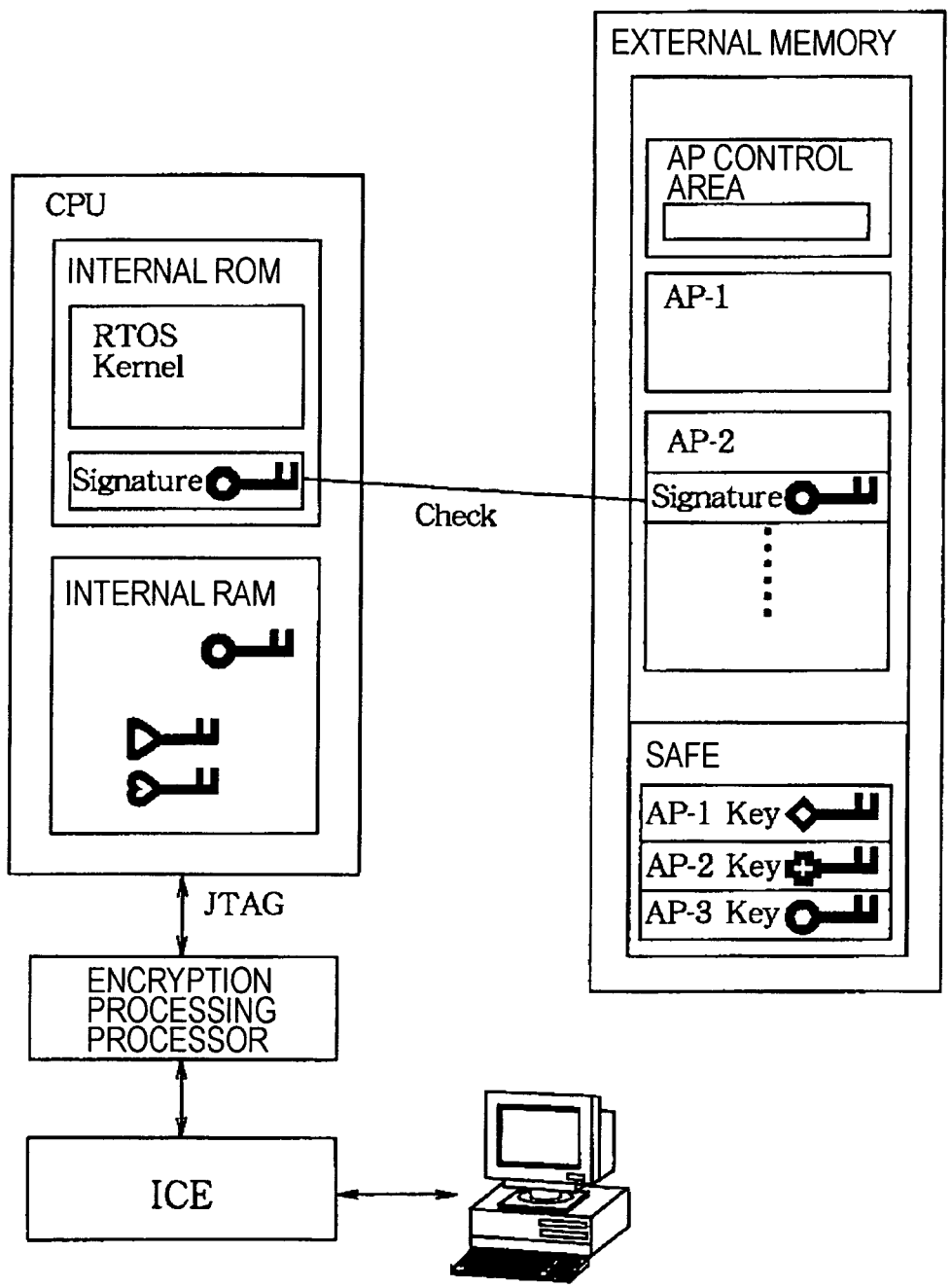
FIG. 4 is a diagram illustrating an example of the hardware configuration of the SAM.

FIG. 4 is a diagram illustrating an example of the configuration of the SAM 1.

As shown in FIG. 4, the SAM 1 has, as a portion, the hardware configuration in which a CPU (Central Processing Unit), a peripheral including an encryption processing processor, etc., and a memory are connected through an internal bus. The CPU is provided with an internal ROM (Read Only Memory) and an internal RAM (Random Access Memory). An RTOS (Real Time Operating system) code, a system stack, a key for managing a safe area formed in an external RAM, etc., which should be kept secret at a maximum are allocated to the internal ROM and the internal RAM.

The SAM 1 has a bus-scramble function capable of encrypting data and code, and decrypting them when communication is performed between the CPU and the external RAM. Also, the SAM 1 has a firewall function capable of setting application programs accessible to individual areas in the external RAM.

Figure 5:
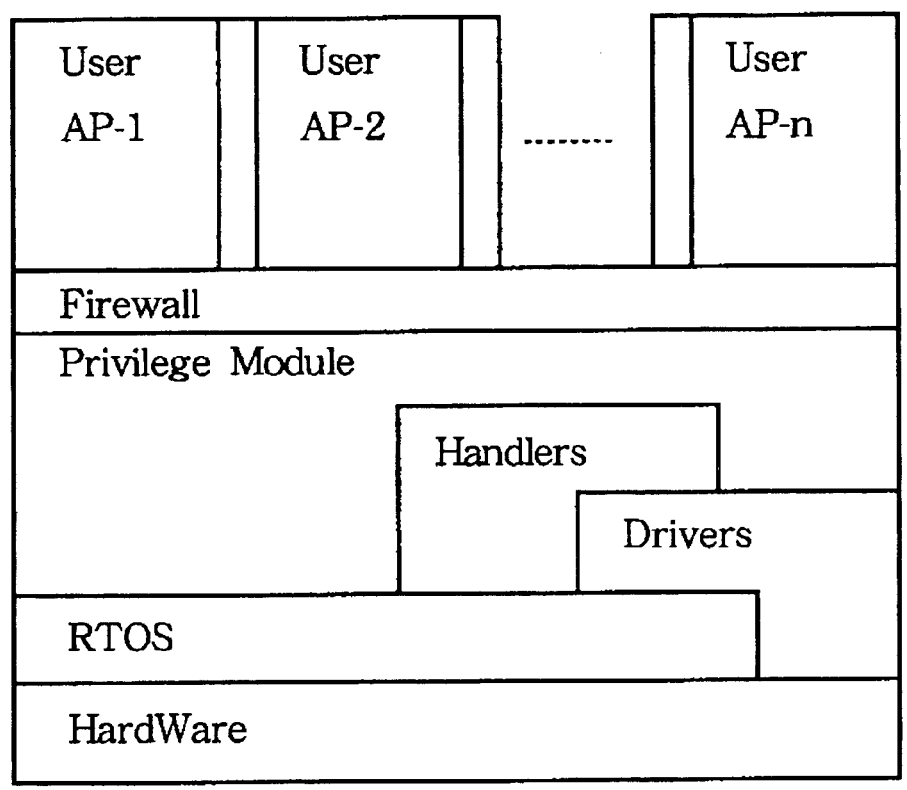
FIG. 5 is a diagram illustrating an example of the software configuration of the SAM.

Next, a description will be given of the software configuration of the SAM 1. FIG. 5 is a diagram illustrating an example of the software configuration of the SAM 1.

As shown in FIG. 5, drivers including the RTOS kernel (RTOS) corresponding to peripheral hardware reside in the lowest layer (the layer which is one layer above the hardware level). Handlers, which perform processing logically integrated as a unit, reside in the upper layer of the driver layer. An upper handler (Privilege Module), which has integrated application-specific libraries, etc., reside in the upper layer of the handler layer. Furthermore, general applications reside in the upper layer of the upper handler layer with a firewall therebetween. In the example of FIG. 5, user AP-1 to user AP-n are shown as general applications.

Figure 6:
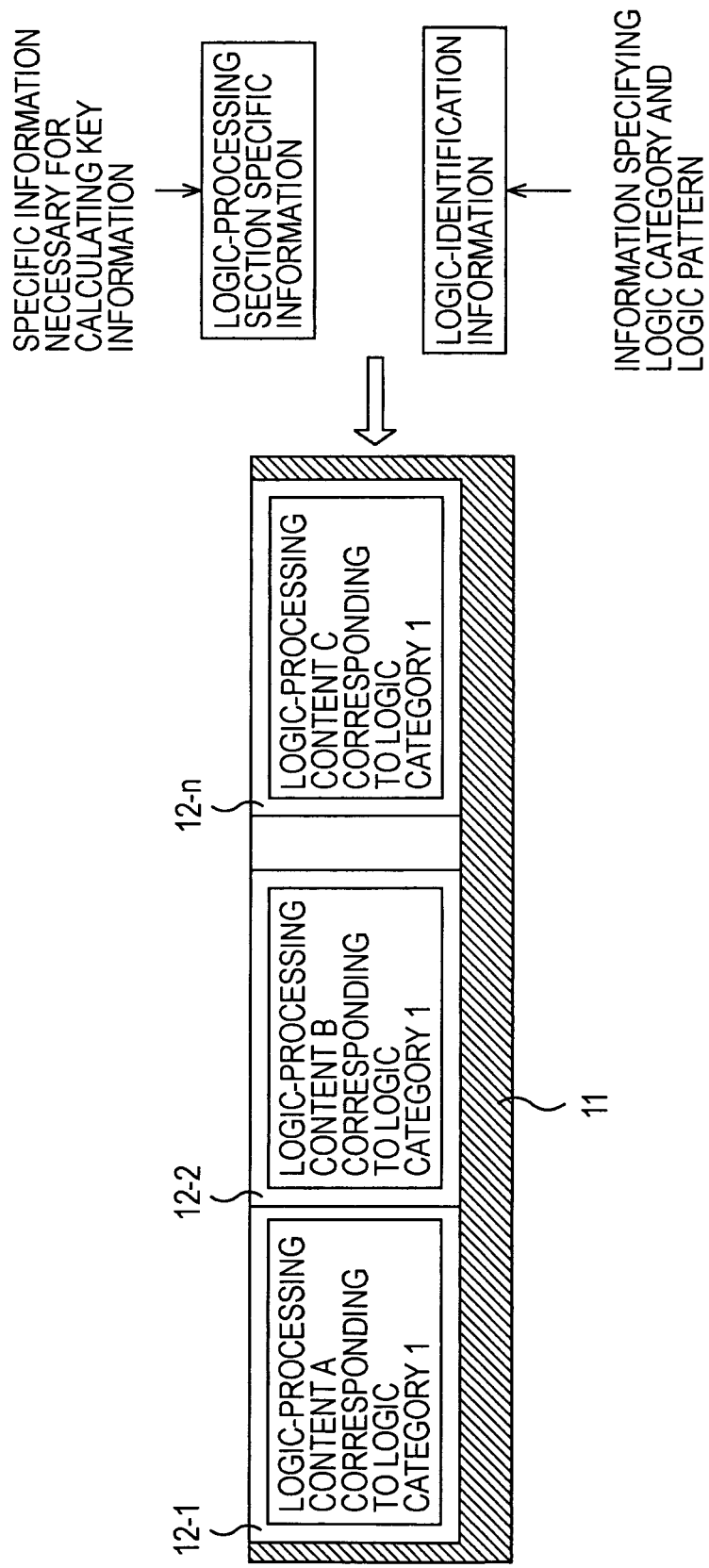
FIG. 6 is a diagram illustrating a specific example of the software configuration of the SAM.

FIG. 6 is a diagram illustrating a specific example of the software configuration of the SAM 1.

As described above, the SAM 1 has a software module provided in common for SAMs achieving any services. The common portion 11 in FIG. 6 is a software module provided in common. The common portion 11 in FIG. 6 corresponds to, for example the RTOS kernel, the drivers, the handlers, the upper handler, and the firewall in FIG. 5.

Also, referring to FIG. 6, the logic 12-1, 12-2, and 12-n are shown as software modules corresponding to the user AP-1, the user AP-2, and the user AP-n in FIG. 5, respectively.

The logic 12-1 is a piece of logic identified by a logic category 1. The logic processing (key-information calculation processing) of a content A is performed in accordance with the algorithm described by the logic 12-1.

The logic 12-2 and the logic 12-n are also pieces of logic identified by a logic category 1. The logic processing of a content B is performed by the logic 12-2 among them, and the logic processing of a content C is performed by the logic 12-n.

The logic for performing processing of a predetermined content identified by the logic category 2 is also provided in the SAM 1 as, for example logic 12-3, etc.

That is to say, the memory of an IC chip carried with a user, who is a service user, includes an area (service area) formed in order to manage necessary data for achieving each service. The SAM 1 is provided, in advance, with a plurality of pieces of logic for calculating key information used for accessing (reading data stored in a service area and writing data to the service area) different service areas of different IC chips.

Specifically, the logic 12-1, 12-2, and 12-n in FIG. 6, which are identified by the logical category 1, are pieces of logic for calculating key information to be used, for example, for accessing a first service area in which an amount of money that is necessary data for achieving a first electronic money service, etc., are managed out of the service areas formed in the memory of the IC chip.

Also, the logic 12-3 (not shown), which is identified by the logical category 2, is a piece of logic for calculating key information to be used, for example, for accessing a second service area of the IC chip, in which an amount of money that is necessary data for achieving a second electronic money service, etc., are managed out of the service areas formed in the memory of the IC chip.

In this manner, a logic category is set in the SAM 1 for each service area of the IC chip to be accessed. A service provider itself can select logic for calculating key information by specifying a logic category corresponding to a service area to be accessed, that is to say, a provided service.

In this regard, the logic 12-1, 12-2, and 12-n in FIG. 6 are pieces of logic (pieces of logic for calculating different key information by different content processing) for performing the logic processing of the contents A, B, and C, respectively. Even if the access destination is the same, for example if it is the first service area in which necessary data for achieving the first electronic money service is managed, when an IC card to be processed is different, different key information becomes necessary for accessing. Thus, a plurality of pieces of logic are provided for performing individually different contents and calculating key information corresponding to one access-destination area.

On the right side in FIG. 6, logic-processing section specific information and logic-identification information are shown as information to be provided to the software including the common portion 11 and the logic 12-1 to 12-n.

The logic-processing section specific information is a parameter to be used for calculating key information, and the logic-identification information is information for specifying a logic category and a logic pattern. The logic pattern is information indicating the sequence of information, in which a plurality of pieces of original information for calculation of the key information are arranged, to be used for operation. This information is set, for example by a service provider before starting the supply of a service.

FIG. 7 is a diagram illustrating an example of logic-identification information.

The logic-identification information including the sequence "00010001" shown in FIG. 7 is the information specifying the logic category "1" and the logic pattern "1", and is given to the common portion 11, etc., in accordance with the operation by a service provider A.

Also, the logic-identification information including the sequence "00010002" is the information specifying the logic category "1" and the logic pattern "2", and is given to the common portion 11, etc., in accordance with the operation by a service provider B. The logic-identification information including the sequence "00020001" is the information specifying the logic category "2" and the logic pattern "1", and is given to the common portion 11, etc., in accordance with the operation by a service provider C.

In this manner, it is possible to constitute the logic-identification information as 4-byte information including the upper 2 bytes which represent a logic category, and the lower 2 bytes which represent a logic pattern.

The logic to be actually operated when the encryption processing is performed is selected from a plurality of pieces of logic provided for the SAM 1 by the logic-identification information having such a structure.

Here, a description will be given of the processing for setting information to the SAM 1 with reference to the flowchart in FIG. 8.

In step S31, the service provider (system administration unit) operates the controller to set the service area of the IC chip used for the service to be provided in the SAM 1. The controller may be implemented, for example in the SAM 1, or may be implemented in the outside apparatus of the SAM 1, such as the application server 2.

The setting of the service area by the controller is accepted by the SAM 1 in step S11. In the SAM 1, the information indicating a logic category, which is the upper 2-byte information out of the logic-identification information in accordance with the accepted service area, is selected.

In step S32, the service provider operates the controller to set the logic pattern indicating the content of the processing for calculating the key information in the SAM 1.

The setting of the logic pattern by the controller is accepted by the SAM 1 in step S12. In the SAM 1, the lower 2-byte information of the logic-identification information is selected in accordance with the accepted logic pattern.

In step S13, the SAM 1 selects logic to be used for providing the service out of a plurality of pieces of the logic provided in advance on the basis of the logic-identification information.

In step S33, the service provider operates the controller to set the logic-processing section specific information (the logic selected in step S13) in the SAM 1. Thus, it becomes possible for the SAM 1 to calculate the key information in accordance with the service area of the IC chip to be processed, and to perform the encryption processing. For example, the above processing is performed before providing the service. The logic-processing section specific information and the logic pattern set before are set in the same manner as, for example storing the key information, etc., in the SAM 1. The way of the setting of the logic-processing section specific information, etc., will be described later.

In step S15, the SAM 1 (the SAM 1 and the reader/writer 5 connected through each apparatus) performs polling for searching an IC chip being held above the reader/writer 5.

The IC chip, which has received the command transmitted by the polling from the reader/writer 5 in step S1 proceeds to step S2, and respond to the command. The response from the IC chip to the polling includes specific information set in the IC chip. Specific identification information is allocated to each of the IC chips embedded in the IC card that has been issued to a service user.

The SAM 1, which has received the response from the IC chip in step S16, proceeds to step S17, and transmits a Request Service command requesting the notification of a list of service areas formed in the memory to the IC chip.

The IC chip, which has received the Request Service command transmitted from the SAM 1 in step S3, proceeds to step S4, and responds to it.

The SAM 1, which has received the response from the IC chip in step S18, proceeds to step S19, and transmits a Read Without Encryption command requesting the transmission of additional information stored in the service area to be an access destination to the IC chip.

The IC chip, which has received the Read Without Encryption command transmitted from the SAM 1 in step S5, proceeds to step S6, and responds to it. The response from the IC chip to the Read Without Encryption command includes information other than the key information, which is stored in the service area, as additional information.

The SAM 1, which has received the response from the IC chip in step S20, proceeds to step S21, and calculates the key information by the logic selected in advance on the basis of the specific information of the IC chip obtained in step S16 and the additional information obtained in step S20.

In step S22, the SAM 1 performs mutual authentication with the IC chip using the calculated key information. For example, the SAM 1 encrypts predetermined information using the calculated key information, and transmits the obtained data to the IC chip.

In step S7, the IC chip decrypts the data transmitted from the SAM 1, encrypts the data obtained by the decryption and the other data using the key information allocated to the service area to be accessed now, proceeds to step S8, and transmits the obtained data to the SAM 1. The key information corresponding to the key information calculated in the SAM 1 is allocated to the service area of the IC chip, and thus it is possible for the IC chip to decrypt the data encrypted by the key information calculated in the SAM 1. On the contrary, the SAM 1 can decrypt the data encrypted by the IC chip using the information allocated to the service area to be accessed.

The data transmitted from the IC chip is received by the SAM 1 in step S23, and the subsequent encryption processing is continued.

In this manner, it becomes possible to provide a plurality of types of logic having different processing contents by one SAM by introducing the configuration enabling the selection of logic by the logic-identification information (logic category and logic pattern).

Also, the service provider can save time and effort for requesting a manufacturer to implement new logic every time a new service is provided.

Furthermore, it has become possible to set the logic specific information, etc., in a data format capable of being set externally by the service provider. Thus, it becomes possible to increase the freedom of the setting, and to manage information at the same level of safety as the key information stored in the SAM.

Figure 9:
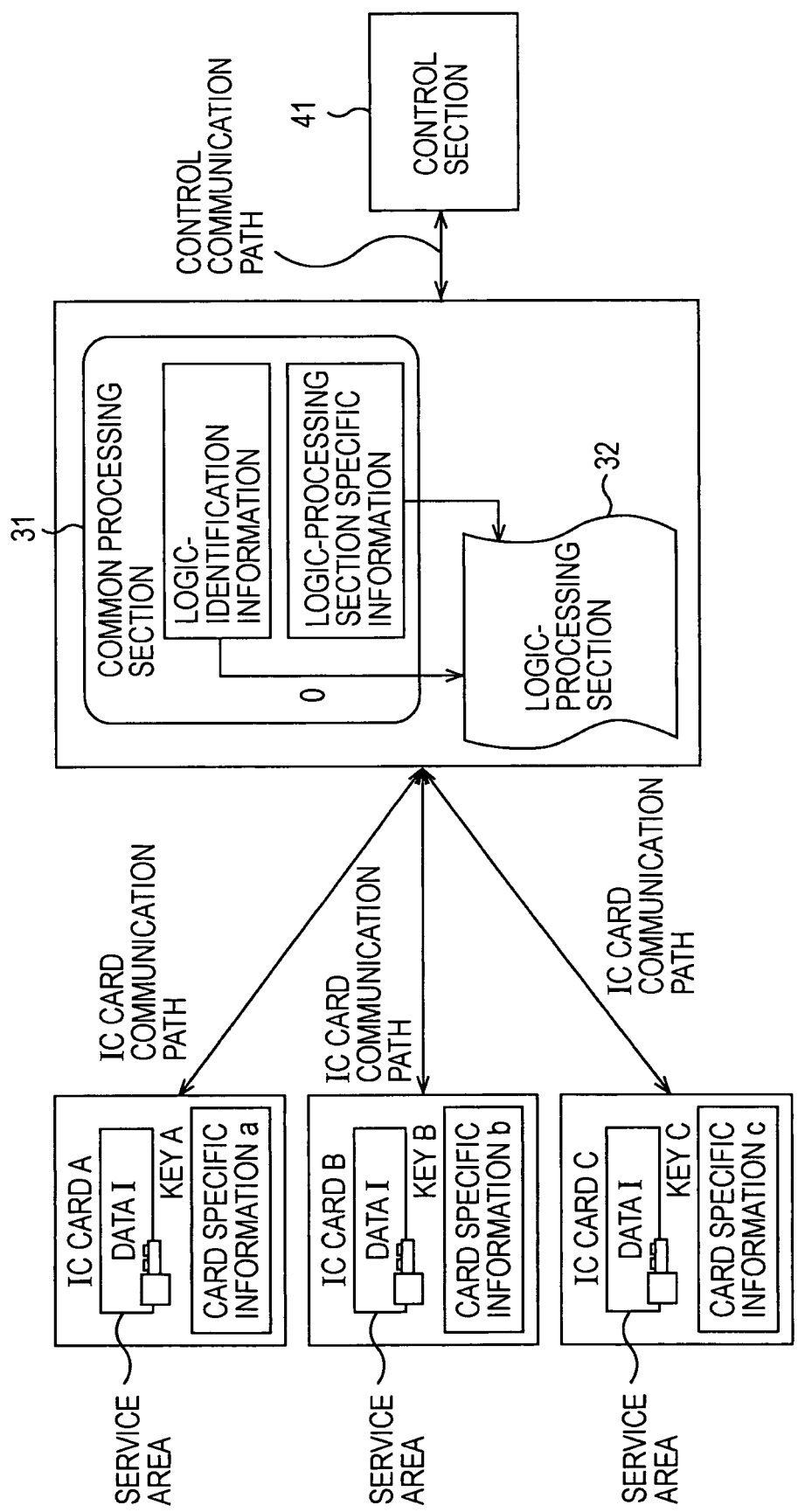
FIG. 9 is a diagram illustrating a specific example of the processing.

FIG. 9 is a diagram illustrating a specific example of the processing performed as described above.

In the example of FIG. 9, IC cards A to C are shown as IC cards (IC chips) to be processed. The IC cards A to C are individually connected to the SAM 1 through an IC card communication path (for example, a path including the application server 2, the Internet 3, the client terminal 4, and the reader/writer 5 in FIG. 3).

Data I is stored in the service area formed in the IC card A, and a key A is allocated to this area. Information a is allocated to the IC card A as card specific information. Also, data I is stored in the service area formed in the IC card B, and a key B is allocated to this area. Information b is allocated to the IC card B as card specific information. Similarly, data I is stored in the service area formed in the IC card C, and a key C is allocated to this area. Information c is allocated to the IC card C as card specific information.

Individual service areas of the IC card A to C are all the areas for storing the same service information, such as the first electronic money service as described above.

Also, in the example of FIG. 9, the common processing section 31 and the logic processing section 32 are implemented in the SAM 1. The common processing section 31 is carried out by the CPU executing the common portion 11 (FIG. 6) out of the software configuration of the SAM 1.

The common processing section 31 selects one piece of logic by the logic-identification information indicating the logic category and the logic pattern corresponding to the service area specified by the control section 41 in accordance with the operation by the service provider (administration unit). The common processing section 31 supplies the logic-processing section specific information set in accordance with the operation by the service provider similarly to the selected logic (to the logic processing section 32 carried out by the logic).

The logic processing section 32 is performed by the CPU executing one piece of logic selected by the logic-identification information supplied from the control section 41 in accordance with the operation by the service provider. As described with reference to FIG. 8, the logic processing section 32 calculates the keys A, B, and C necessary for accessing the data I in the IC cards A, B, and C, respectively, and performs the encryption processing with the IC cards A, B, and C, respectively using the calculated keys A, B, and C.

That is to say, the control section 41 is performed in the controller (FIG. 8) implemented in the SAM 1 or in the application server 2. The specification of the service area, the logic pattern, and the logic-processing section specific information in accordance with the operation of the service provider is input from the control section 41 to the SAM 1 through the control communication path.

FIGS. 10 to 13 are diagrams illustrating specific examples of individual information in FIG. 9.

FIG. 10 is a diagram illustrating an example of the key information.

In the example in FIG. 10, the key (the key allocated to the service area in which the data I is stored) of the data I in the IC card A is represented by "12345678h" in hexadecimal, and the key of the data I in the IC card B is represented by "81234567h" in hexadecimal. Also, the key of the data I in the IC card C is represented by "78123456h" in hexadecimal.

FIG. 11 is a diagram illustrating an example of the specific information.

In the example in FIG. 11, the specific information a of the IC card A is represented by "1h" in hexadecimal, and the specific information b of the IC card B is represented by "2h" in hexadecimal. Also, the specific information c of the IC card C is represented by "3h" in hexadecimal.

FIG. 12 is a diagram illustrating an example of additional information.

In the example in FIG. 12, all the pieces of the additional information of the data I stored in the service area of the IC cards A to C are represented by "1h" in hexadecimal. Here, the additional information is the information other than the key information for identifying the data I. The number of the pieces of the additional information used for generation of the key information is not limited to one.

FIG. 13 is a diagram illustrating an example of the logic-processing section specific information.

In the example in FIG. 13, the logic-processing section specific information to be given to the logic processing section 32 is represented by "34567812h" in hexadecimal. The logic-processing section specific information is the information directly referenced by the logic processing section 32 as an input parameter at the time of the calculation of the key information. The number of the pieces of the information is not limited to one.

The logic processing section 32 inputs the specific information of the IC card, the additional information I1 of the data I, and the logic-processing section specific information to generate the key for accessing the data I. For example, when the IC card A is to be processed, the logic processing section 32 assumes the specific information a to be the specific information of the IC card A, and assumes the key A to be the key for accessing the data I.

A service provider usually defines the logic processing section 32, determines the value of the key (the key information allocated to the service area) of the data I of the IC cards A to C based on that definition, and issues an IC card having the key, represented by the value, allocated to the service area. Thus, the key information corresponding to the key information managed by the SAM 1 becomes allocated to the service area of the IC chip. In this regard, the calculation algorithm of the key information receives the specific information of the IC card, the additional information I1 of the data I, and the logic-processing section specific information as input, and uses arithmetic operators, encryption operators, etc.

Here, it is assumed that there area two types of key-information calculation algorithm: one is a key-information calculation algorithm when the service area to be processed is identified by the logic category 1, and the other is a key-information calculation algorithm when the service area is identified by the logic category 2.

Figure 14:
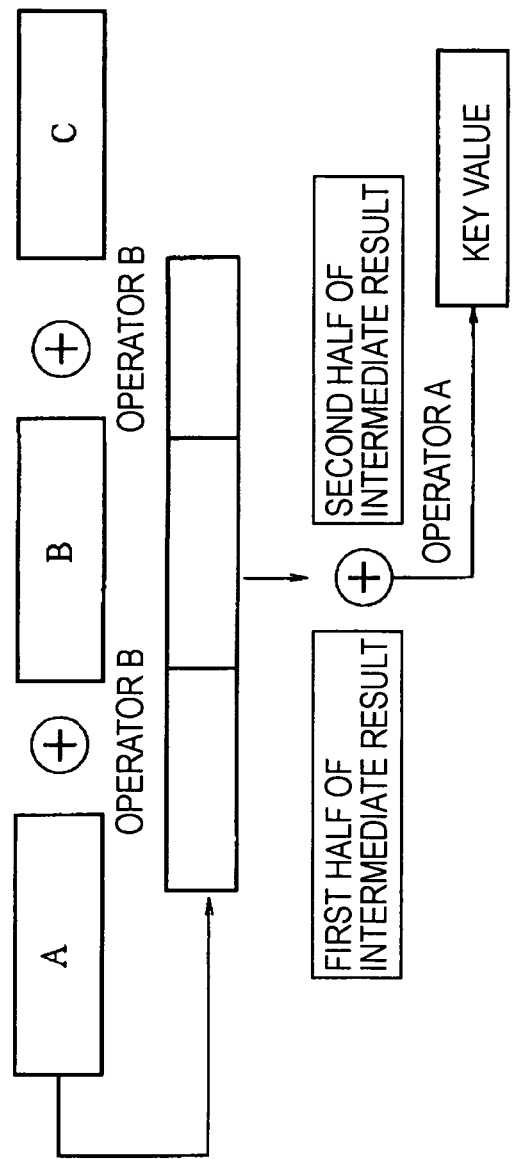
FIG. 14 is a diagram illustrating an example of a key-information calculation algorithm.

FIG. 14 is a diagram illustrating an example of a key-information calculation algorithm.

The key-information calculation algorithm shown in FIG. 14 is for the service area identified by the logic category 1. The key information is calculated by individually inserting the specific information of the IC card to be processed, the additional information, and the logic-processing section specific information into the fields A, B, and C of FIG. 14 in a predetermined sequence. Which of the information is inserted into which of the fields A, B, and C is identified, for example by the logic pattern. In the example of FIG. 14, one sequence out of six types of sequence is identified by the logic pattern.

Figure 15:
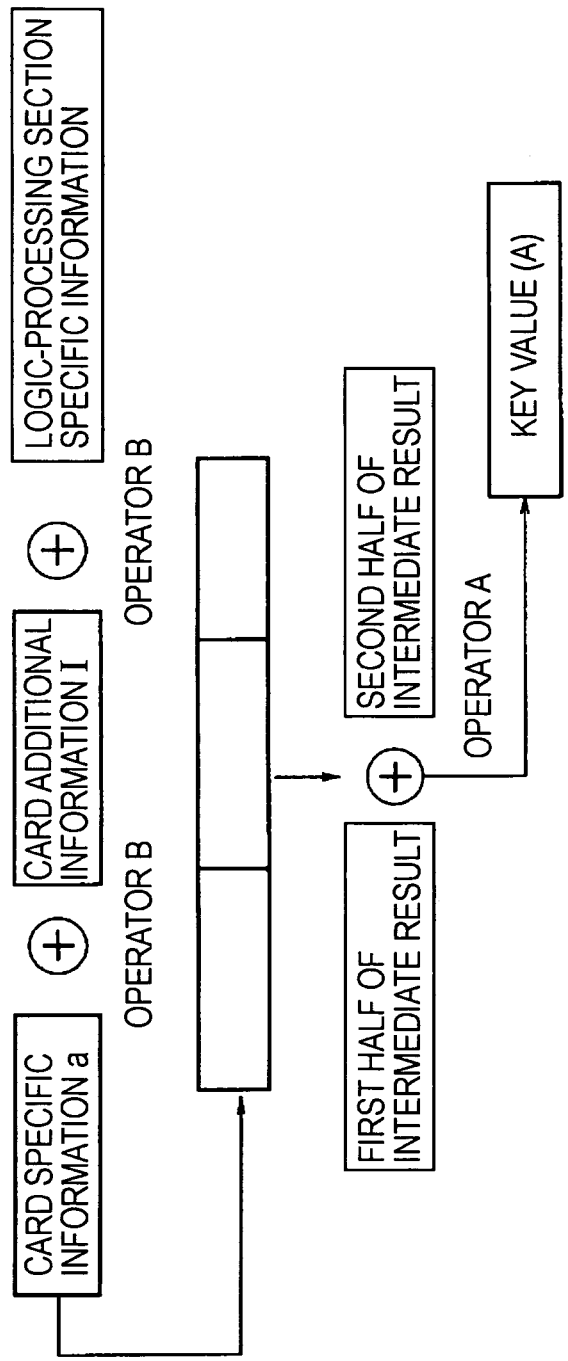
FIG. 15 is a diagram illustrating a specific example of key-information calculation.

For example, as shown in FIG. 15, when the specific information a of the IC card A is inserted into the field A, the additional information I is inserted into the field B, and the logic-processing section specific information is inserted into the field C, the key A (12345678h) is calculated by operators A and B as the key information for performing the encryption processing on the IC card A.

Figure 16:
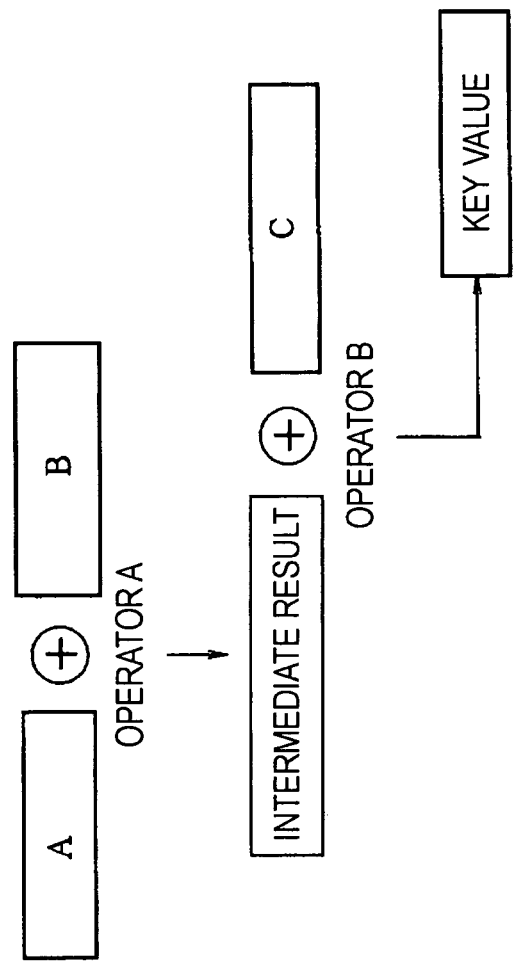
FIG. 16 is a diagram illustrating another example of a key-information calculation algorithm.

FIG. 16 is a diagram illustrating another example of a key-information calculation algorithm.

The key-information calculation algorithm shown in FIG. 16 is for the service area identified by the logic category 2. The key information is calculated by individually inserting the specific information of the IC card to be processed, the additional information, and the logic-processing section specific information into the fields A, B, and C of FIG. 16 in a predetermined sequence.

Figure 17:
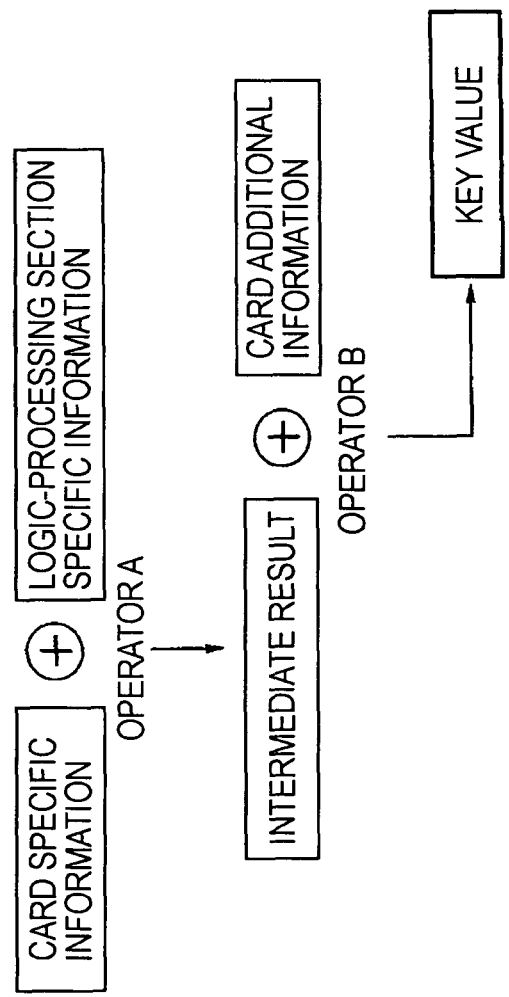
FIG. 17 is a diagram illustrating another specific example of key-information calculation.

In the example of FIG. 17, the specific information of the IC card A is inserted into the field A, the logic-processing section specific information is inserted into the field B, and the additional information is inserted into the field C, and a predetermined key value is calculated by the operators A and B.

Figure 18:
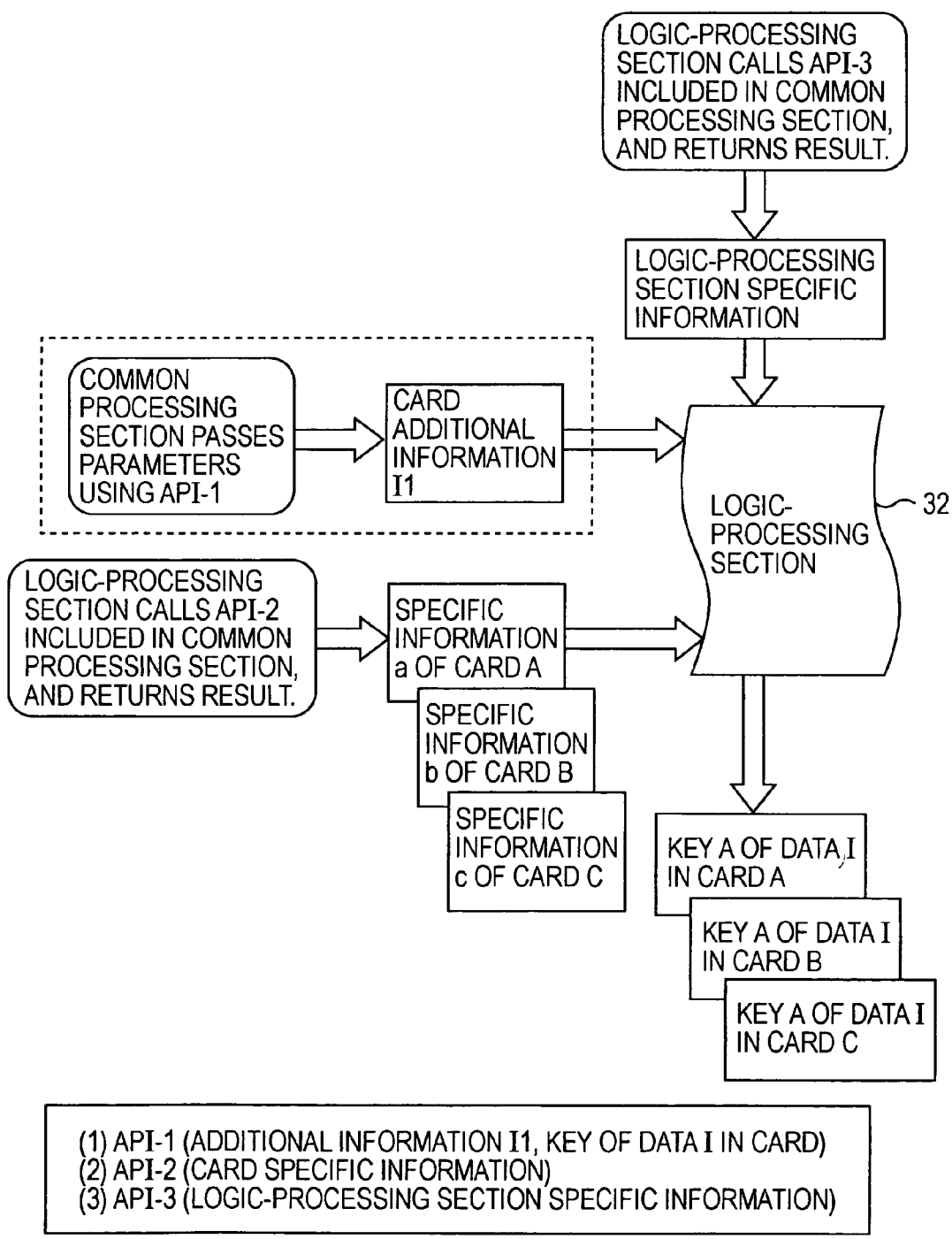
FIG. 18 is a diagram illustrating a flow of information centering around a logic processing section.

FIG. 18 is a diagram illustrating a flow of information centering around the logic processing section 32.

First, a logic category and a logic pattern are set by the logic-identification information, and the logic (logic processing section) is determined. This determination is made before the execution of the processing on the IC card.

The parameters passed from the common processing section 31 to the logic processing section 32 when performing processing on the IC card are divided by the APIs (Application Programming Interfaces) included in the common processing section 31 into the following three types.

(1) IC Card Additional Information I1 Passed from API-1

The API-1 of the common processing section 31 passes the additional information I1 to the logic processing section 32. The key information calculated by the logic processing section 32 is returned (supplied) to the common processing section 31 by the return value of the API-1 or by a value written into the buffer address passed as an input parameter. The encryption processing is performed between the common processing section 31 and the IC card using the supplied key information.

The additional information I1 is supplied from the IC card to the SAM 1 in a state of being not encrypted. Thus, it is easy for the person who has not implemented the logic to know the additional information I1 exceptionally compared with the information provided with being encrypted. However, only the additional information can be known, and it is difficult to identify the other important information (the logic-processing section specific information, etc.) provided by the service provider, etc., and used for the processing by the logic processing section 32.

(2) IC Card Specific Information Passed from API-2

The API-2 of the common processing section 31 passes the specific information of the IC card to the logic processing section 32 in response to the request from the logic processing section 32. The specific information of the IC card is returned to the logic processing section 32 by the return value of the API-2.

(3) The API-3 of the Common Processing Section 31 Passes the Logic-processing Section Specific Information to the Logic Processing Section 32

The logic-processing section specific information is returned to the logic processing section 32 by the return value of the API-3 or by a value written into the buffer address passed as an input parameter.

Finally, a description will be given of a mechanism capable of setting the logic-processing section specific information, etc., while ensuring secrecy.

Figure 19:
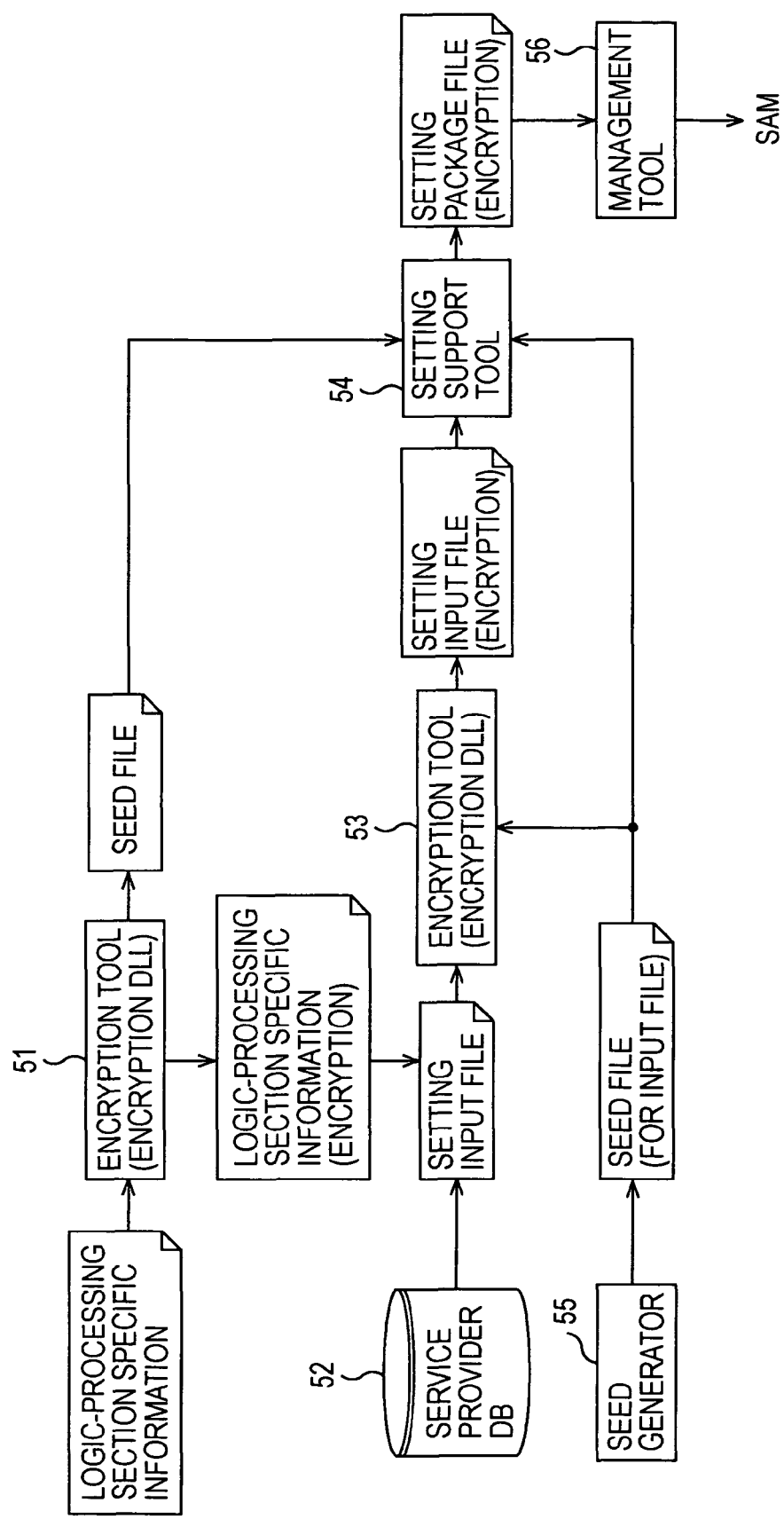
FIG. 19 is a diagram illustrating an example of the configuration of a setting apparatus and the data processed by each component of the apparatus.

FIG. 19 is a diagram illustrating an example of the configuration (tool) of a setting apparatus for setting the logic-processing section specific information in the SAM 1, and the data processed by each component of the apparatus. In this setting apparatus, the logic-processing section specific information to be set is subjected to the encryption processing twice, and the logic-processing section specific information is set using the encrypted information.

Figure 8:
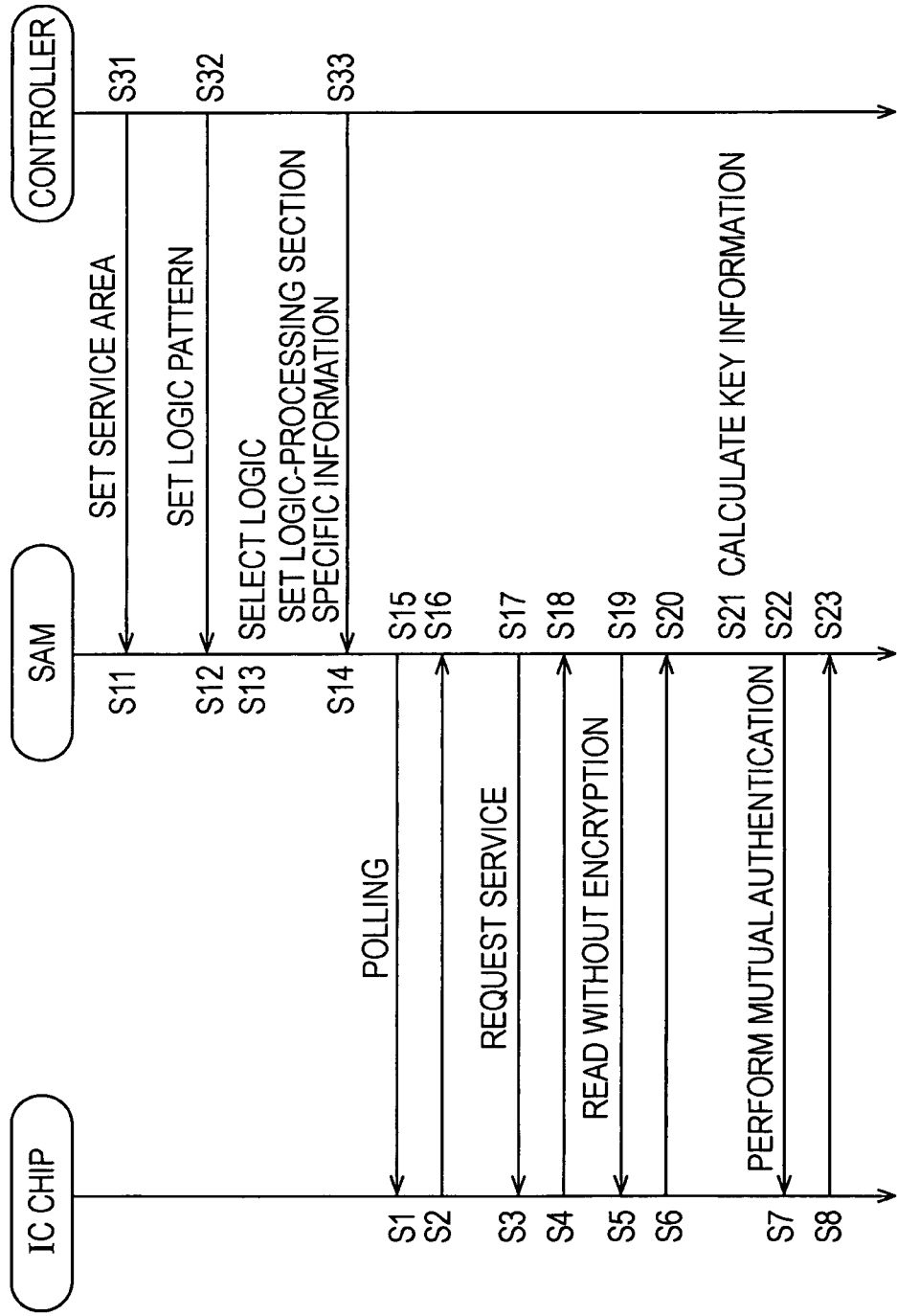
FIG. 8 is a flowchart illustrating the processing performed by the information processing system of FIG. 3.

The setting apparatus having the configuration as shown in FIG. 19 is implemented in the SAM 1, or the controller in FIG. 8, which includes a personal computer, etc., connected to the SAM 1.

As shown at the upper left in FIG. 19, the logic-processing section specific information entered by the service provider is input into the encryption tool 51. In the encryption tool 51, encryption is performed on the input logic-processing section specific information. Thus, the encryption is performed on the logic-processing section specific information once.

The logic-processing section specific information encrypted by the encryption tool 51 is described as a statement of an input file provided for the service provider DB 52, and the obtained setting input file is supplied to the encryption tool 53. A file including a description of the information for decrypting the encryption performed on the logic-processing section specific information is supplied from the encryption tool 51 to the setting support tool 54 as a seed file.

In the encryption tool 53, the encryption using the seed file (for input file) generated by the seed generator 55 as a key is performed on the entire setting input file, and thus the second-time encryption is performed on the logic-processing section specific information. The setting input file encrypted by the encryption tool 53 is output to the setting support tool 54.

In the setting support tool 54, the encryption performed on the setting input file, that is to say, the second-time encryption on the logic-processing section specific information, is decrypted on the basis of the seed file generated by the seed generator 55. Also, in the setting support tool 54, the first-time encryption performed on the logic-processing section specific information described as a statement of the setting input file is decrypted on the basis of the seed file supplied from the encryption tool 51.

In the setting support tool 54, a setting package file is generated on the basis of the logic-processing section specific information (plain text data) obtained by the decryption. The setting package file is appropriately encrypted using a package key in the setting support tool 54.

The setting package file obtained by the setting support tool 54 is output to the management tool 56, and is output to the SAM 1 by the management tool 56. The setting package file has a format enabling the SAM 1 to capture various information described in that file.

Figure 20:
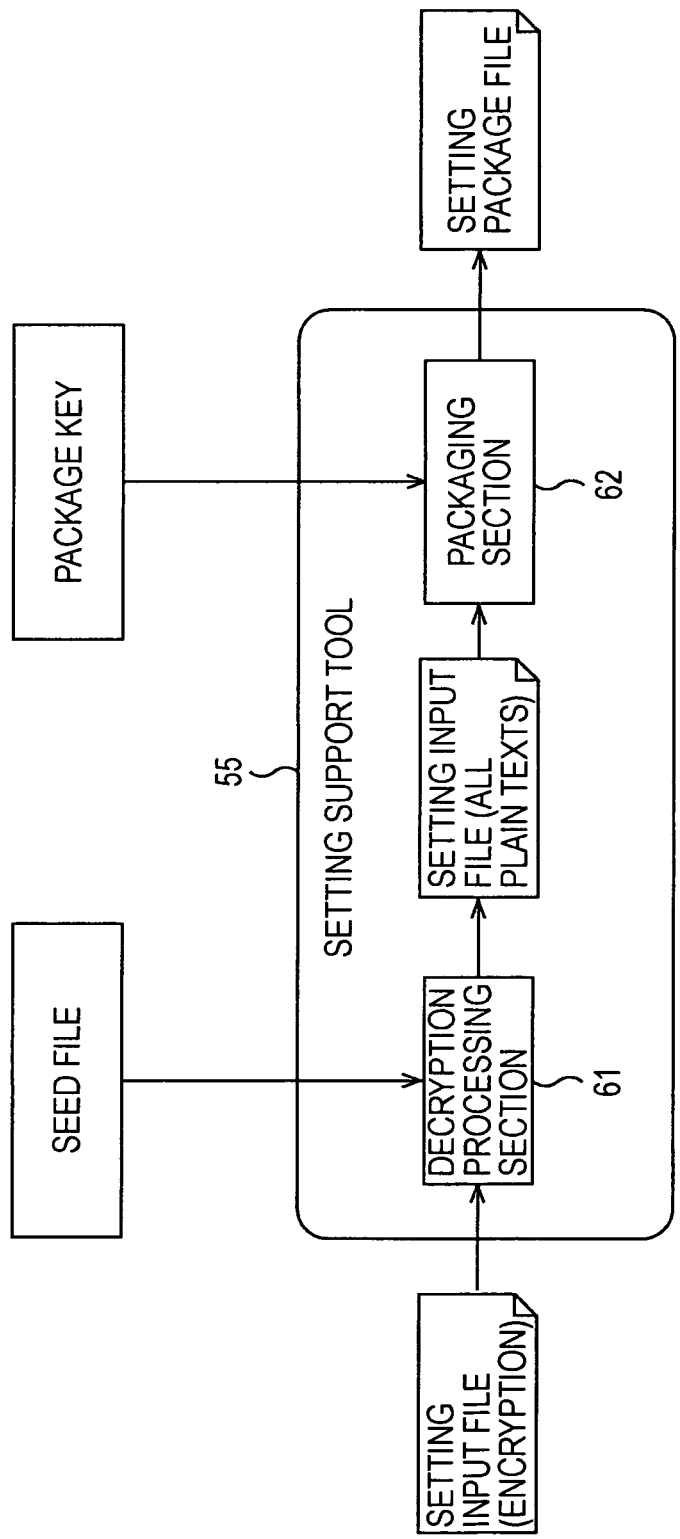
FIG. 20 is a diagram illustrating an example of the detailed configuration of a setting support tool.

FIG. 20 is a diagram illustrating an example of the detailed configuration of the setting support tool 54 in FIG. 19.

The setting input file, which has been generated by the encrypted logic-processing section specific information being described as a statement, is input into a decryption processing section 61. In the decryption processing section 61, the encryption performed on the setting input file using the seed file generated by the seed generator 55 is decrypted as described above. Also, the encryption performed on the logic-processing section specific information is decrypted using the seed file supplied from the encryption tool 51.

The setting input file, which has been subjected to the decryption and has entirely become plain-text data, is output to a packaging section 62. In the packaging section 62, a package file having a format enabling the SAM 1 to capture the logic-processing section specific information is generated, the package file is appropriately encrypted using a package key, and then the package file is output to the management tool 56.

For example, the first-time encryption on the logic-processing section specific information using the encryption tool 51 is performed by the service provider itself, and the subsequent processing is performed by a programmer who sets information in the SAM 1. Thus, it is possible for the service provider to set the logic-processing section specific information determined by the service provider itself in the SAM 1 without the programmer knowing the information. That is to say, it becomes possible to separate the person who determines the logic-processing section specific information, which becomes a parameter necessary for calculating the key information, and the person who sets information in the SAM 1.

In this regard, the setting may be carried out by such a mechanism not only when setting the logic-processing section specific information, but also when setting the other information, such as key information, etc., which becomes necessary for the SAM 1 to perform processing.

The above-described series of processing can be executed by hardware or can be executed by software. When the series of processing is executed by software, the programs constituting the software are built in a dedicated hardware of a computer. Alternatively, the various programs are installed in, for example a general-purpose personal computer capable of executing various functions from a recording medium.

Figure 21:
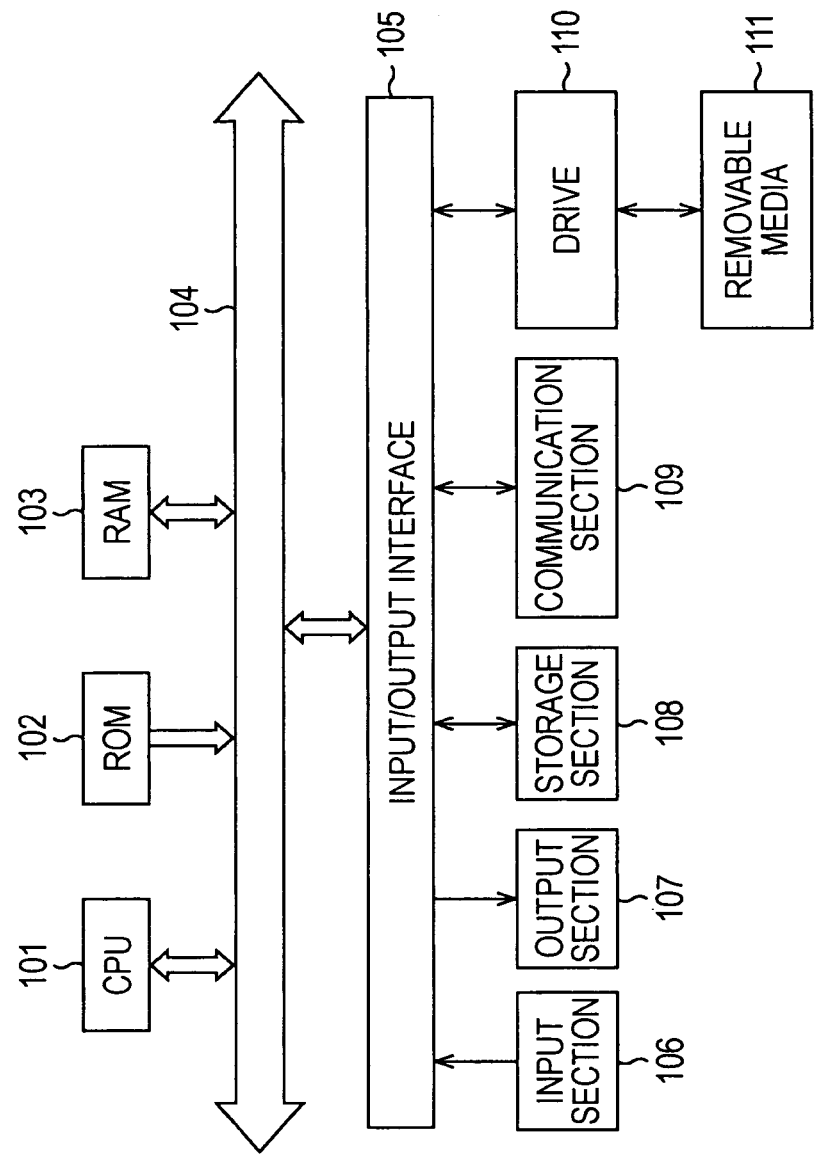
FIG. 21 is a block diagram illustrating an example of the configuration of a personal computer.

FIG. 21 is a block diagram illustrating an example of the configuration of a personal computer for executing the above-described series of processing. A CPU 101 executes various kinds of processing in accordance with the programs stored in a ROM 102 or a storage section 108. A RAM 103 appropriately stores programs to be executed by the CPU 101, data, etc. The CPU 101, the ROM 102, and the RAM 103 are mutually connected with a bus 104.

An input/output interface 105 is connected to the CPU 101 through the bus 104. An input section 106 including a keyboard, a mouse, a microphone, etc., and an output section 107 including a display, a speaker, etc., are connected to the input/output interface 105. The CPU 101 executes various kinds of processing in accordance with instructions input from the input section 106. The CPU 101 outputs the result of the processing to the output section 107.

The storage section 108 connected to the input/output interface 105 includes, for example a hard disk, and stores the programs executed by the CPU 101 and various kinds of data. A communication section 109 communicates with external apparatuses through a network such as the Internet, a local area network, etc.

Also, the programs may be obtained through the communication section 109, and may be stored in the storage section 108.

When a removable medium 111, such as a magnetic disk, an optical disc, a magneto-optical disc, or a semiconductor memory, etc., is attached, a drive 110 connected to the input/output interface 105 drives the medium, and obtains the program and the data recorded there. The obtained program and data are transferred to the storage section 108 as necessary, and is stored there.

The program recording medium for storing the programs, which are installed in a computer and is executable by the computer, includes, as shown in FIG. 21, a removable medium 111 which is a package medium including, such as a magnetic disk (including a flexible disk), an optical disc (including a CD-ROM (Compact Disc-Read Only Memory) and a DVD (Digital Versatile Disc)), a magneto-optical disc, or a semiconductor memory, etc. Alternatively, the program recording medium includes a ROM 102 for storing the programs temporarily or permanently, a hard disk constituting the storage section 108, etc. The storage of the programs into the program recording medium is carried out through the communication section 109, which is a router, a modem, etc., as necessary, or using a wired or wireless communication medium, such as a local area network, the Internet, a digital satellite broadcasting, etc.

In this regard, in this specification, the steps describing the programs to be stored in the program recording medium include the processing to be performed in time series in accordance with the described sequence as a matter of course. Also, the steps include the processing which is not necessarily executed in time series, but is executed in parallel or individually.

Also, in this specification, a system represents the entire apparatus including a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that uses key information calculated from predetermined information, which includes identification information received from an IC chip that is external to the information processing apparatus, to perform encryption processing, the information processing apparatus comprising:
calculating means, which includes a plurality of calculation modules, configured to calculate unique key information specific to each calculation module in accordance with predetermined logic described by each calculation module;
control means configured to identify one of the calculation modules based on the identification information to provide an identified calculation module; and for causing the calculation means to calculate the unique key information specific to the identified calculation module; and
encryption means configured to encrypt data based on the unique key information, wherein identification information includes logic category information that identifies the predetermined logic described by the identified calculation module.

2. The information processing apparatus according to claim 1,
wherein the control means includes an administration unit that is configured to select and set the predetermined information.

3. An information processing method for encryption processing using key information calculated from predetermined information, which includes identification information received by an information processing apparatus from an IC chip that is external to the information processing apparatus, comprising:
identifying a calculation module based on the identification information to provide an identified calculation module;
calculating unique key information specific to the identified calculation module in accordance with predetermined logic described by the identified calculation module; and
encrypting data based on the unique key information,
wherein identification information includes logic category information that identifies the predetermined logic described by the identified calculation module.

4. The method of claim 3, wherein the control means includes an administration unit that is configured to select and set the predetermined information.

5. A non-transitory computer readable medium storing program code for encryption processing using key information calculated from predetermined information, which includes identification information received by the computer from an IC chip that is external to the computer, the program code being executable by a processor to perform operations comprising:
identifying a calculation module based on the identification information to provide an identified calculation module;
calculating unique key information specific to the identified calculation module in accordance with predetermined logic described by the identified calculation module; and
encrypting data based on the unique key information,
wherein identification information includes logic category information that identifies the predetermined logic described by the identified calculation module.

6. The computer readable medium of claim 5, wherein the control means includes an administration unit that is configured to select and set the predetermined information.

7. A setting apparatus that sets a portion of predetermined information received from an administration unit of the setting apparatus, comprising:
first encryption configured to encrypt the portion of the predetermined information to generate a first encrypted portion;
second encryption configured to encrypt the first encrypted portion and a file based on a seed file to generate a setting file;
generation means configured to perform a first decryption on a portion of the seed file that contains the first encrypted portion to generate a first decrypted portion, for performing a second decryption on the first decrypted portion to generate plain text data, and for generating a package file based on the plain text data.

8. The apparatus of claim 7, wherein the setting apparatus is included in an information processing apparatus and further includes a setting means for outputting the packaged file generated by the generation means to the information processing apparatus.

9. A method for setting a portion of predetermined information received from an administration unit of a setting apparatus, comprising:
    encrypting the portion of the predetermined information to generate a first encrypted portion;
    encrypting the first encrypted portion and a file based on a seed file to generate a setting file;
    performing a first decryption on a portion of the seed file that contains the first encrypted portion to generate a first decrypted portion;
    performing a second decryption on the first decrypted portion to generate plain text data; and
    generating a package file based on the plain text data.

10. The method of claim 9, wherein the method is performed by the setting apparatus, which is included in an information processing apparatus, and
    wherein the method further includes outputting the packaged file generated from the setting apparatus to the information processing apparatus.

11. A non-transitory computer readable medium storing program code for setting a portion of predetermined information received, the program code being executable by a processor to perform operations comprising:
    encrypting the portion of the predetermined information to generate a first encrypted portion;
    encrypting the first encrypted portion and a file based on a seed file to generate a setting file;
    performing a first decryption on a portion of the seed file that contains the first encrypted portion to generate a first decrypted portion;
    performing a second decryption on the first decrypted portion to generate plain text data;
    and generating a package file based on the plain text data.

* * * * *